Patented Apr. 8, 1952

2,592,263

UNITED STATES PATENT OFFICE 2,592,263

METHOD OF REACTING GELATIN WITH NAPHTHYL ISOCYANATES AND RESULTING PRODUCTS

Gordon F. Frame, Rochester, N. Y., assignor to Eastman Kodak Company, Rochester, N. Y., a corporation of New Jersey No Drawing. Application August 13, 1947, Serial No. 768,473

7 Claims. (Cl. 260—117)

This invention relates to derivatives of gelatin having distinctive properties prepared by reacting gelatin with α- or β-naphthyl isocyanate.

Gelatin has been known for several decades and has been found to have many and varied applications making use of either its solubility characteristics, its possession of an isoelectric point, or its water swelling characteristics. Gelatins vary as to the degree to which they are susceptible to the action of water, depending among other things on their purity, the method by which they were prepared, and their chemical makeup. It has sometimes been found desirable to alter the characteristics of gelatin by treatments, some of which are chemical in nature.

One object of my invention is to prepare derivatives of gelatin. Another object of my invention is to prepare gelatin compounds having new and different characteristics than either of the compounds employed in their preparation. A further object of my inventin is to prepare new compounds from gelatin and naphthyl isocyanates. Other objects will appear herein.

I have found that the reaction products of α- and β-naphthyl isocyanates exhibit unique characteristics in their various viscosities, in the change of viscosity with change of pH, in their swelling characteristics, in their susceptibility to hardening agents, in the flocculation of silver bromide sols, and in their water solubility at their isoelectric point.

The products of my invention are prepared by heating an aqueous dispersion of gelatin with a solution of naphthyl isocyanate at an alkaline pH. Instead of water, non-aqueous solvents, each as formamide may be employed as the solvent for the gelatin. The reaction is found to proceed most satisfactorily at a pH of 10–11 and at a temperature within the range of 30–50° C. However, the reaction may be conducted at any alkaline pH (between 8 and 12) and at a temperature in the range in which it is convenient to work with gelatin in solution (such as 30–70° C.) but the time should be very short if temperatures above 40° C. are employed if breakdown of the gelatin is to be avoided. If not important, breakdown need not be guarded against. Degraded gelatin or glue may be used as the starting material if desired.

It is desirable during the course of the reaction to add alkali from time to time to maintain a fairly constant pH. After the reaction has been completed (sometimes as long as one-half hour), it is desirable in recovering the gelatin compound to neutralize with acid, set the mass by cooling, and wash free from salts, etc., with cold water. If desired, drying may be direct without any washing operation.

The gelatin derivatives of my invention are characterized by their resistance to hardening by formaldehyde in contrast to gelatin and by their greater resistance to chrome alum hardening than gelatin. These gelatin derivatives also differ from gelatin in their susceptibility to dyes, their swelling properties, their viscosity characteristics, and their solubility in water at the isoelectric point.

The gelatin derivatives of my invention are generally useful in capacities in which gelatin has previously been used but with the difference that many differing properties are found. These gelatin derivatives may be employed in lithograph printing processes, for preparing silver halide dispersions, as a vehicle for the silver halide in photographic emulsions or in imbibition processes in photography. These gelatin derivatives are especially useful as peptizing agents in preparing silver halides in dispersed form as disclosed in application Serial No. 768,475, of myself and Yutzy filed of even date.

The following examples illustrate the preparation of the products in accordance with my invention:

*Example 1.*—275 parts of gelatin were dispersed in 3000 parts of water at 40° C. 10% aqueous sodium hydroxide was then added to bring the pH to 10. Over a period of approximately five minutes a solution of 21 parts of α-naphthyl isocyanate in 400 parts of dry acetone was slowly added to the gelatin dispersion accompanied by vigorous stirring. Additions of 10% aqueous sodium hydroxide were made from time to time to maintain the pH at approximately 10. After the α-naphthyl isocyanate was all added, the dispersion was stirred twenty-five minutes at 40° at a pH of 10. Dilute sulfuric acid was then added to lower the pH to 6, and the dispersion was chilled causing it to gel. The gel was shredded into noodles and washed with water. If desired, however, the gelled gelatin derivative could be employed directly.

*Example 2.*—The above process was repeated except that β-naphthyl isocyanate was employed instead of the alpha compound.

The gelatin derivatives of my invention are particularly useful for preparing silver-halide dispersions and for use as protective colloids in silver-halide photographic emulsions. For instance, if silver nitrate and alkali metal halide are reacted together in an aqueous solution of a gelatin derivative made in accordance with my invention, the silver halide grains formed are uniformly dispersed so as to render the resulting material useful for the preparation of photographic products. The gelatin derivatives in accordance with my invention are also characterized by being inert to the photographic chemicals which are employed in developing and fixing photographic emulsions.

I claim:

1. A gelatin derivative resulting from the reaction of gelatin with a naphthyl isocyanate at a temperature of 30–70° C. and a pH of 8–12.

2. A gelatin derivative resulting from the reaction of gelatin with α-naphthyl isocyanate at a temperature of 30–70° C. and a pH of 8–12.

3. A gelatin derivative resulting from the reaction of gelatin with β-naphthyl isocyanate at a temperature of 30–70° C. and a pH of 8–12.

4. A method of preparing gelatin derivatives which comprises reacting a solution of gelatin in water with a naphthyl isocyanate at a temperature of 30–70° C. and at a constant pH within the range of 8–12 and maintaining that pH by the addition of alkali to the reaction mass from time to time during the course of the reaction.

5. A method of preparing gelatin derivatives which comprises reacting a solution of gelatin in water with an α-naphthyl isocyante at a temperature of 30–70° C. and at a constant pH within the range of 8–12 and maintaining that pH by the addition of alkali to the reaction mass from time to time during the course of the reaction.

6. A method of preparing gelatin derivatives which comprises reacting a solution of gelatin in water with a β-naphthyl isocyanate at a temperature of 30–70° C. and at a constant pH within the range of 8–12 and maintaining that pH by the addition of alkali to the reaction mass from time to time during the course of the reaction.

7. A method of preparing gelatin derivatives which comprises reacting a solution of gelatin in water with a naphthyl isocyanate at a temperature of 30–50° C. and a constant pH within the range of 10–11 which pH is maintained throughout the reaction by the addition from time to time of sodium hydroxide to the reaction mass.

GORDON F. FRAME.

REFERENCES CITED

The following references are of record in the file of this patent:

UNITED STATES PATENTS

| Number | Name | Date |
|---|---|---|
| 2,220,441 | Esselmann et al. | Nov. 5, 1940 |
| 2,374,136 | Rothrock | Apr. 17, 1945 |
| 2,518,666 | Damschroder et al. | Aug. 15, 1950 |

OTHER REFERENCES

Olcott: Ind. and Eng. Chem., (January 1946), vol. 38, pp. 104–106.

Fraenkel-Conra et al.: Jour, Am. Chem. Soc., vol. 67, pp. 314–319 (February 1945).

Sidgwick: 'The Organic Chemistry of Nitrogen" (Oxford University Press; 1937), p. 332.